US005584046A

United States Patent [19]
Martinez et al.

[11] Patent Number: 5,584,046
[45] Date of Patent: Dec. 10, 1996

[54] METHOD AND APPARATUS FOR SPECTRUM SHARING BETWEEN SATELLITE AND TERRESTRIAL COMMUNICATION SERVICES USING TEMPORAL AND SPATIAL SYNCHRONIZATION

[75] Inventors: René D. Martinez, Newfield; Richard C. Compton, Ithaca, both of N.Y.

[73] Assignee: Cornell Research Foundation, Inc., Ithaca, N.Y.

[21] Appl. No.: 336,193

[22] Filed: Nov. 4, 1994

[51] Int. Cl.[6] .............................. H04B 7/185; H04B 7/19; H04B 7/495

[52] U.S. Cl. ...................... 455/13.1; 455/13.2; 455/51.1; 455/56.1

[58] Field of Search ................................. 455/12.1, 13.1, 455/13.2, 33.1, 56.1, 51.1; 370/31, 75, 103, 108, 95.3, 95.1, 104.1, 197; 375/354, 356

[56] References Cited

U.S. PATENT DOCUMENTS

| | | | |
|---|---|---|---|
| 3,982,075 | 9/1976 | Jefferis et al. | 370/104.1 |
| 4,004,098 | 1/1977 | Shimasaki | 370/104.1 |
| 4,188,578 | 2/1980 | Reudink et al. | 370/104.1 |
| 4,425,639 | 1/1984 | Acampora et al. | 370/75 |
| 4,747,160 | 5/1988 | Bossard | 455/33 |
| 5,239,671 | 8/1993 | Linquist et al. | 455/13.1 |
| 5,268,694 | 12/1993 | Jan et al. | 342/354 |
| 5,313,654 | 5/1994 | Comroe et al. | 455/56.1 |
| 5,327,572 | 7/1994 | Freeburg | 455/13.1 |
| 5,343,512 | 8/1994 | Wang et al. | 379/59 |
| 5,455,961 | 10/1995 | Nakagawa | 370/104.1 |

*Primary Examiner*—Chi H. Pham
*Assistant Examiner*—Gertrude Arthur
*Attorney, Agent, or Firm*—Jones, Tullar & Cooper, P.C.

[57] ABSTRACT

A system and method for spatially and temporally synchronizing satellite (space based) and terrestrial (ground based) communications services using time division multiple access between the two types of service providers is given. Satellite and terrestrial communication services are assigned geographic cell boundaries to prevent conflicting simultaneous use of allocated spectrum. The spatial synchronization of cell boundaries can occur before hand by agreement between the users of the satellite and terrestrial services. This spatial synchronization may conform to geographic as well as political boundaries. Satellite and terrestrial services are assigned time slots to use a given spectrum within a given area. Methods are described for synchronizing the time slots to prevent interference between the services. Synchronization of LMDS and Teledesic services is described in the disclosure of a preferred embodiment.

12 Claims, 8 Drawing Sheets

METHOD AND APPARATUS FOR SPECTRUM SHARING BETWEEN SATELLITE AND TERRESTRIAL COMMUNICATION SERVICES USING TEMPORAL AND SPATIAL SYNCHRONIZATION

BACKGROUND OF THE INVENTION

The present invention pertains, in general, to operating diverse types of radio transmitters in shared spectrum in a given geographical area.

There is an ever-increasing demand for radio communications which utilize large segments (or bands) of the electromagnetic spectrum. However, the spectrum is a finite commodity, and there is not enough to serve every projected need. Thus, electromagnetic spectrum is an extremely valuable commodity.

Spectrum is allocated in discrete segments for assigned uses, usually navigation, communication or some combination of the two. The Federal Communications Commission (FCC) closely regulates the spectrum to ensure that transmitters operate within carefully defined limits of frequency, time, and geographical area. Limits on geographical area are often expressed in terms of minimum distances of separation for two transmitters; limits on time of operation are sometimes expressed as time slots.

The FCC also regulates the operation of satellite (space-based) systems which illuminate the United States with transmissions from space. Thus, satellite systems vie for this finite spectrum with terrestrial (ground-based) systems.

Often, FCC spectrum allocations mete out spectrum in bands which become, over time, under-utilized. In the prior art, a number of methods have been developed to maximize the utility of available spectrum.

An historical example illustrates how these developments can occur. The FCC originally allocated L-band, 960–1215 MHz, to a military aircraft navigational system for TACtical Air Navigation (TACAN). As pressures grew to add functions to aircraft, the allocation was changed to permit a second system to share the L-band with TACAN. The second system, Identify Friend or Foe (IFF), was allocated two narrow sub-bands in the L-band, centered at 1030 MHz and 1090 MHz. This method of dividing frequencies in a spectral band is one way to reconcile needs of more than one service.

Still later, a third system was needed and, as a result of an extensive testing effort, it was determined that the L-band could support this third system, the Joint Tactical Information Distribution Service (JTIDS). JTIDS was given a limited allocation to use the L-band spectrum, but only at low power and only at specified distances from TACAN users. JTIDS was also designed to avoid the two IFF sub-bands centered at 1030 MHz and 1090 MHz. JTIDS, a spread spectrum, frequency-hopped communications system, was thus accommodated. By dividing the frequencies up between TACAN and IFF, and then utilizing spatial, spectral and temporal restrictions for JTIDS, the FCC brought about more effecient use of the available L-band spectrum. This example illustrates how, for terrestrial systems users, similar types of users may be accommodated in a given band of spectrum for a given geographical area.

At present, however, other types of users must be considered; namely, those with satellite systems. Satellite transmitters have different problems that cannot be dealt with using narrow sub-bands or low powered signals, for such transmitters may illuminate large areas of the earth with a down linked signal. Furthermore, earth stations transmitting up link signals back to those satellites may be transmitting in nearly horizontal low orbit directions, thus irradiating large portions along the earth's surface between the earth station and the satellite. These satellite and earth station transmitters may interfere with terrestrial communications, in a given common spectral band, unless steps are taken to sort out how the spectrum is utilized.

As an example, it is noted that one system which is currently competing for spectrum is the space-based Teledesic (TM) communications system. The Teledesic system uses 800 MHz of bandwidth in two separate 400 MHz bands (for standard terminal subscribers). The system provides uplink transmissions in the 28 GHz band and downlink transmissions in the 19 GHz band. Teledesic subscribers will have difficulty in using the 28 GHz band, however, unless some accommodation is made for the terrestrial Local Multipoint Distribution Service (LMDS), for the LMDS system also uses the 28 Ghz band.

SUMMARY OF THE INVENTION

The present invention is directed to a method and apparatus which allows both terrestrial and satellite transmitting services to share the electromagnetic spectrum within a given geographical area. With this method, a plurality of services are assigned time slots to use the spectrum within a given area. Methods are described for synchronizing the time slots to prevent interference between the services.

The present invention includes a method based on Time Division Multiple Access (TDMA) for spectrum sharing. TDMA gives rise to a need for spatial regulations for operation and to a requirement for continuous temporal synchronization between services to prevent interference. The method of the present invention, for spatially and temporally synchronizing space based and ground based transmitting elements, involves at the outset, defining a first geographic area for coverage by a first ground based communications element and defining a second geographic area for coverage by a first space based communications element, where the first geographic area is situated within the second geographic area. Once the areas are defined, the first ground based element, within the first geographic area, may transmit only when the first space based element is not transmitting.

With the method of the present invention, space-based (satellite) and ground-based (terrestrial) communication elements are integrated into spatially and temporally synchronized transmitters using TDMA between the different types of service providers. More specifically, ground communication element are to be synchronized (using standardized terrestrial communication areas) with space based communications elements (having significantly larger standardized communication areas).

In a preferred embodiment of the present invention, a terrestrial communication system such as an LMDS system, is synchronized with a space-based communications system, such as a Teledesic system. A plurality of standard terrestrial communication zones, or cells, will fit within an area defined by a space-based cell, since a communication satellite transmission illuminates a significantly larger geographic area than the area defined by a terrestrial cell. In a typical system, approximately 16 terrestrial cells will fit within one space-based cell. At each terrestrial cell site a synchronization controller is adapted to prevent terrestrial source transmissions within the cell during satellite downlink and uplink transmissions. Time slots for transmission of both satellite and terrestrial are assigned, and the geographical areas which correspond to the terrestrial cells and the satellite cells are also assigned, in accordance with the present invention, either by government authority of by mutual agreement of the operators of the transmitter systems.

BRIEF DESCRIPTION OF THE DRAWINGS

The foregoing and additional objects, features, and advantages of the invention will become apparent to those of skill in the art from the following detailed description of a preferred embodiment, taken with the accompanying drawings, in which:

FIG. 3 diagrammatically illustrates, in perspective view, ground-based and space-based communication elements and their respective directions of radiation for four cells along a line between two cells.

DETAILED DESCRIPTION

Figure 1:
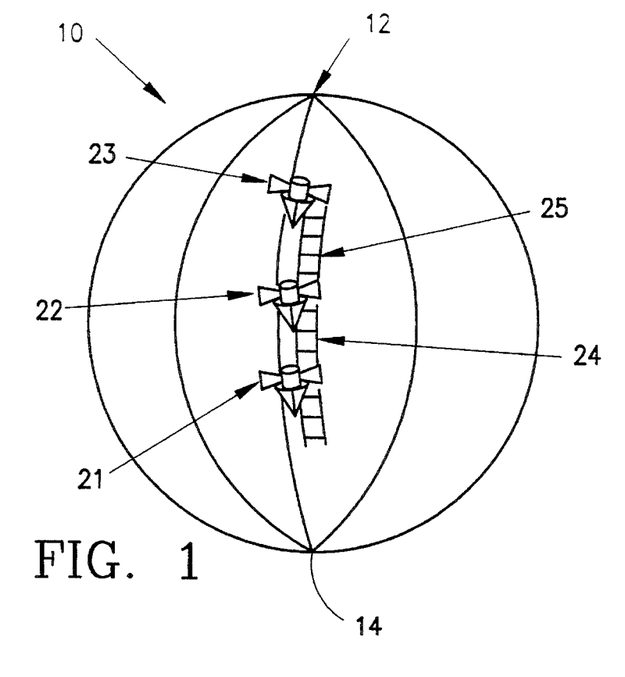
FIG. 1 illustrates, in diagrammatic form, a communication system having a number of satellites positioned over the earth with the track of the satellites being defined by contiguous super cells illuminated on the earth, along a polar orbit.

Turning now to a more detailed description of the invention, there is illustrated in FIG. 1, the earth 10 having a north pole 12 and a south pole 14, with a constellation of satellites 21, 22, and 23 which travel from the northern hemisphere to the southern hemisphere in polar orbits. A polar orbit is an orbit which encircles the earth 10 and bisects the axis of the earth which passes through north pole 12 and south pole 14. The satellites 21, 22, and 23 are spatially staggered. Although three satellites are depicted, a sufficient number of satellites could be deployed which would allow line of sight communications over the entire earth's surface. As illustrated, each satellite has a transmitter, a receiver, a controller with a synchronizing clock, and a plurality of beam steering antennas which compensate for the satellite's motion and illuminate corresponding fixed geographical areas on the earth's surface. These areas are referred to as satellite super cells, and are illustrated at 24 and 25 in FIG. 1. The antennas located on each satellite allow coverage of more than one super cell at a given moment and the satellite nearest to a given super cell communicates with subscribers having earth stations within that super cell. For example, when satellites 21 and 22 travel further away from their respective designated super cells 24 and 25, the satellites communicate to hand-off super cells 24 and 25 to satellites 22 and 23, respectively, for communication with subscribers.

Each super cell is divided into nine satellite cells. The antennas on a satellite are preferably conventional hopping, spot beam antennas, and each antenna sequentially illuminates through the nine cells for communications services in known manner.

Figure 2:
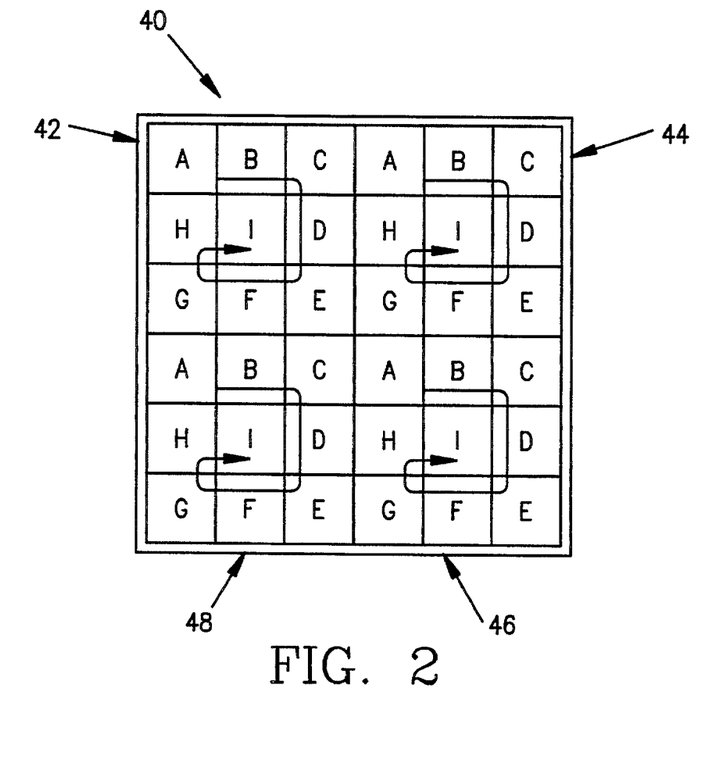

Turning now to FIG. 2, a region 40 has, for example, four satellite super cells 42, 44, 46 and 48 each super cell includes nine satellite cells. The hopping spot beam antennas on each satellite sequentially illuminate each of the nine satellite cells, A, B, C, D, E, F, G, H, and I within each satellite super cell in a clockwise spiral, as illustrated. This satellite super cell illumination is referred to as a scan cycle. With the illustrated scan cycle, a satellite cell is never illuminated simultaneously with its neighbor even if the neighboring satellite cell is from another super cell. Thus, no satellite cell A–I, in satellite super cell 42 will be illuminated at the same time as an adjacent satellite cell from adjacent satellite super cells 44, 46, and 48 are illuminated. This prevents two antennas, for example, one from satellite 21 and one from satellite 22, from simultaneously illuminating adjacent satellite cells, thereby causing a spatial interference problem.

While the hopping spot beam antenna located on a satellite is scanning sequentially through the satellite cells to illuminate selected cells, the spectrum in non-selected cells is available. Thus, for example, when the spot beam antenna scans cells A–H in super cell 42, the spectrum inside the area of cell I is available for use.

Figure 3:
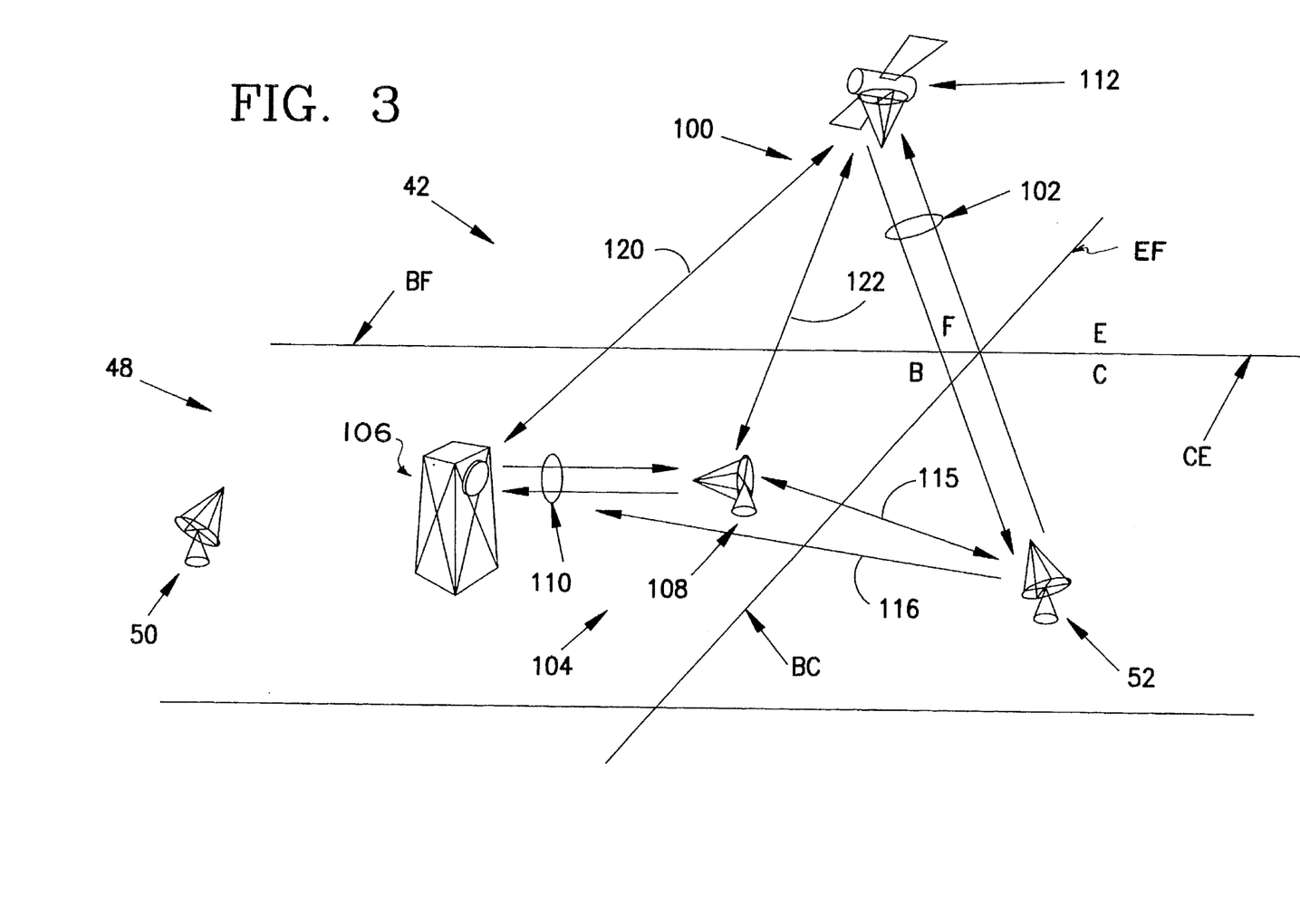
FIG. 3 illustrates a plan view diagram of four super cells and a pattern of cell illumination from a first cell A to a ninth cell I in a spiral pattern within each super cell.

Satellite earth stations, such as those illustrated at 50 and 52 in FIG. 3 sited within corresponding satellite cells and each is equipped with an antenna, a transmitter, a receiver and a controller with a synchronizing clock, for transmitting uplink signals to a satellite and receiving downlink signals from a satellite transmitter.

Turning now to FIG. 3, a subset of the area depicted in FIG. 2 is illustrated in perspective. A satellite communications system 100 produces a spot beam 102 which follows the scan patterns as shown in FIG. 2. Within the area shown in FIG. 3 the satellite spot beam 102 moves in super cell 48 from illuminating satellite cell B to cell C and continues through the scan cycle to illuminate cells, D, E, F, G, H, and I (not shown in FIG. 3). The satellite communications system 100 is sited with a terrestrial communications system 104 which, for the purposes of the present disclosure, includes a terrestrial tower 106 and one or more terrestrial subscriber units 108. The terrestrial tower includes a plurality of antennae, each connected to a corresponding transmitter and a corresponding receiver. Each terrestrial subscriber unit includes an antenna, a transmitter and a receiver. The terrestrial tower 106 in satellite cell B communicates along a line of sight path 110 with terrestrial subscribers at a site 108, for example. At the same instant that the terrestrial tower is transmitting to its subscribers, a satellite 112 in the satellite communications system 100 may focus the spot beam 102 along a line of sight path to satellite subscribers at earth station 52 in cell C.

There are boundaries between adjacent cells which define areas of potential interference. Boundary BC bisects the areas of cell B and cell C in a supercell 48. Similarly, boundary EF bisects the areas of cell E and cell F in s supercell 42; boundary CE bisects the areas of cells C and E; and boundary BF bisects the cells B and F. The cell boundaries, such as BC, define regions in which there are potential interference paths such as those illustrated at 115 and 116. These potential interference paths mark areas of interference between satellite and terrestrial services. As illustrated in FIG. 3, earth station transmitters 50 and 52 for the satellite communication system may coexist by operating at different frequencies than the transmitters for the terrestrially based communications system 104. However, if these communication systems operate at the same frequency, there may be interference between them.

For example, terrestrial subscriber unit 108 and earth station 52 may transmit at a given frequency $F_u$ and receive at a frequency $F_d$. With this arrangement, interference along path 115 between terrestrial subscriber unit 108 and earth station 52 is impossible. Accordingly, when earth station 52 is transmitting to satellite 112, then terrestrial subscriber unit 108 cannot receive that signal, since terrestrial subscriber unit 108 would be receiving at frequency $F_d$ while earth station 52 would be transmitting at frequency $F_u$. This gives rise to a frequency diversity which serves to eliminate electromagnetic compatibility problems between geographically close terrestrial subscriber units and satellite earth stations. Similarly, satellite 112 and terrestrial tower 106 transmit at a frequency $F_d$ and receive at a frequency $F_u$ so interference along a path 120 is also impossible.

There is still a potential problem with interference, for it is possible for interference to occur across cell boundary BC along path 116 and along a celestial path 122 if the antennas are poorly chosen or poorly aimed. However, in the illustration to terrestrial subscriber unit 108, near the cell boundary BC, is aimed horizontally and towards the center of cell B, while satellite earth station 52 is aimed upwardly towards the satellite. In this example, the interference problem along paths 116 and 122 is mitigated if directional antennas are used on terrestrial subscriber unit 108 and earth station 52.

Temporal synchronization can, with the method of the present invention, be used to further mitigate interference. Satellite cells B and C (shown in Fig. 3) are arbitrarily assigned to super cell 48 and cells E and F to super cell 42. After communicating with earth station subscribers in cell I in super cell 48, the downlink beam from satellite 112 returns to cell A to begin another scan cycle (see FIG. 2). After the satellite 112 communicates with satellite earth station subscribers (not shown) in cell A, terrestrial subscriber unit 108 in cell B is temporarily deactivated from communicating. This deactivation of terrestrial subscriber unit 108 allows the satellite earth station 50 in cell B to communicate with satellite 112. When the satellite 112 is finished communicating with satellite earth station 50 in cell B, the beam continues through its scan cycle to illuminate station 52 in satellite cell C and terrestrial subscriber unit 108 is reactivated for communication with the terrestrial tower 106. This method divides time for transmission in cell B between satellite and terrestrial services.

Thus, with the method of the present invention, time-sharing between satellite and terrestrial services in cell B is effected; this is equivalent to Time Division Multiple Access (TDMA) between the two kinds of services.

To prevent interference between satellite earth stations and terrestrial subscriber units and interference between the terrestrial tower 106 and the satellite 112, each transmitter may include circuits such as crystal oscillators and phase-locked loops to assist in maintaining the assigned frequencies, $F_u$ and $F_d$. To minimize the interference near the cell boundaries, directional antennas on the subscriber units confine the electromagnetic radiation during transmission and reception. Other interference may occur between terrestrial and satellite services if the satellite scan cycle and terrestrial activation are not synchronized. If they are not in synchronization, a connection problem arises when both services use the frequencies $F_u$ and $F_d$ simultaneously in the same cell.

"Contention" is a well known term of art in the communications field and describes the garbled result which occurs in a communications channel when more than one transmitter begins radiating. When contention has occurred, one of the transmitting parties must stop transmitting to allow ungarbled access to the channel.

Figure 4:
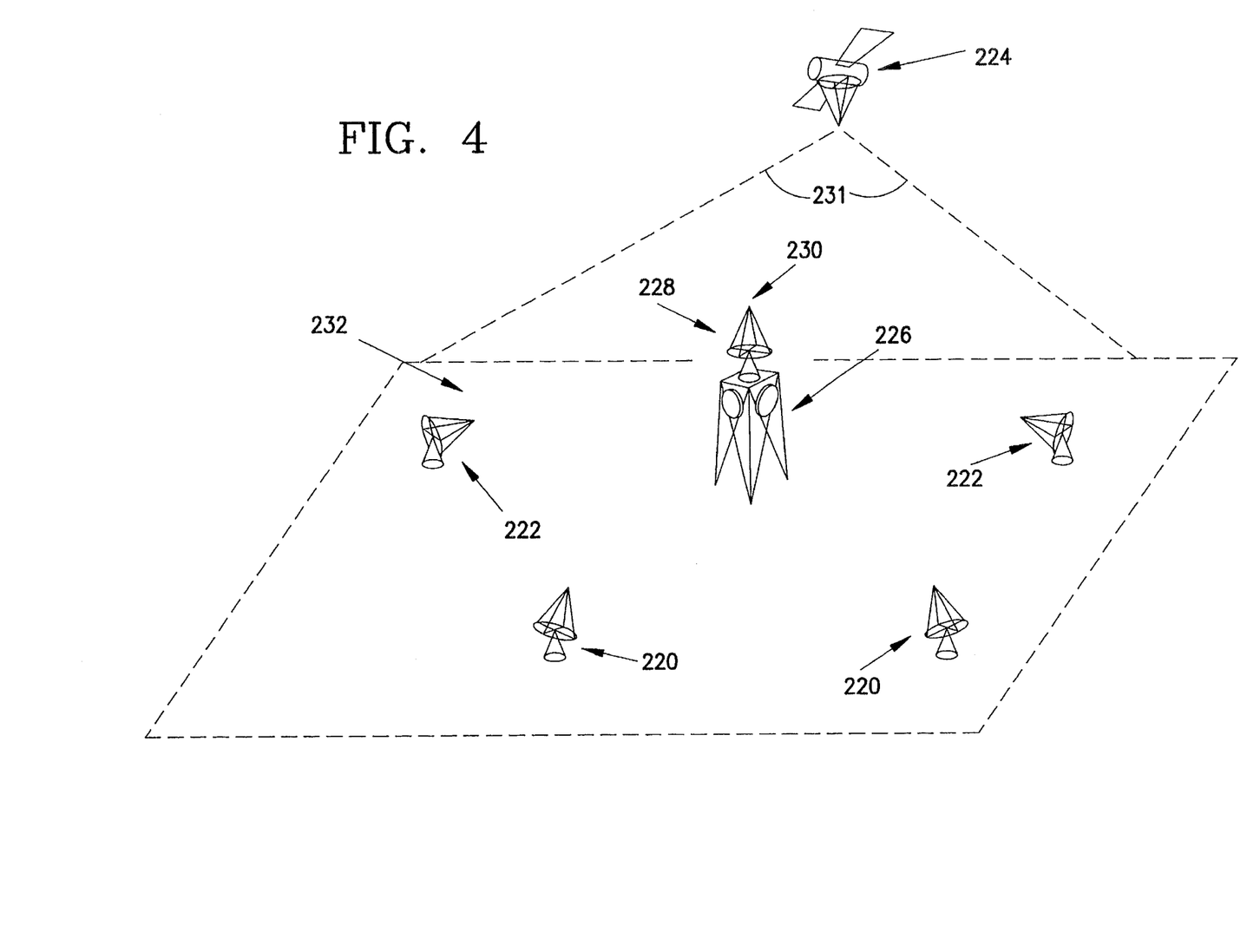
FIG. 4 diagrammatically illustrates satellite and terrestrial subscriber units and the position of these elements in relation to a satellite and a terrestrial tower.

In the embodiment illustrated in FIG. 4, both satellite earth stations 220 and terrestrial subscriber units 222 are TDMA transceivers and their timing is controlled by their respective transmitters, satellite 224 and terrestrial tower 226. Atop tower 226 is a synchronizing receiver 228 with a directional antenna 230 which monitors celestial satellite downlink transmissions at frequency $F_d$. For an (arbitrarily) assigned satellite scan cycle of 27 mS, each cell in a nine cell scan cycle is allocated a 3 mS time interval for every scan cycle. For this time interval, 2.5 mS are used for communications with the cell and 0.5 mS is set aside for the spot beam to move (or hop) onto the next cell. The synchronizing receiver 228 senses and synchronizes terrestrial communications to the satellite scan cycle. A connection from the synchronizing receiver 228 to the terrestrial tower 226 provides the time of the scan cycle and in turn, timing information is sent to terrestrial subscriber units 222. Both the terrestrial tower 226 and terrestrial subscriber units 222 stop transmission for 3.5 mS just before a spot beam 231 from satellite 224 moves to illuminate the cell 232 where the terrestrial subscriber units 222 and the terrestrial tower 226 are located. Of the 3.5 mS that the terrestrial service is not transmitting, two 0.5 mS intervals are allocated for the spot beam to move into and out of the cell and a 2.5 mS interval is allocated for satellite service communications between the satellite 224 and earth stations 222.

Figures 4A, 4B:
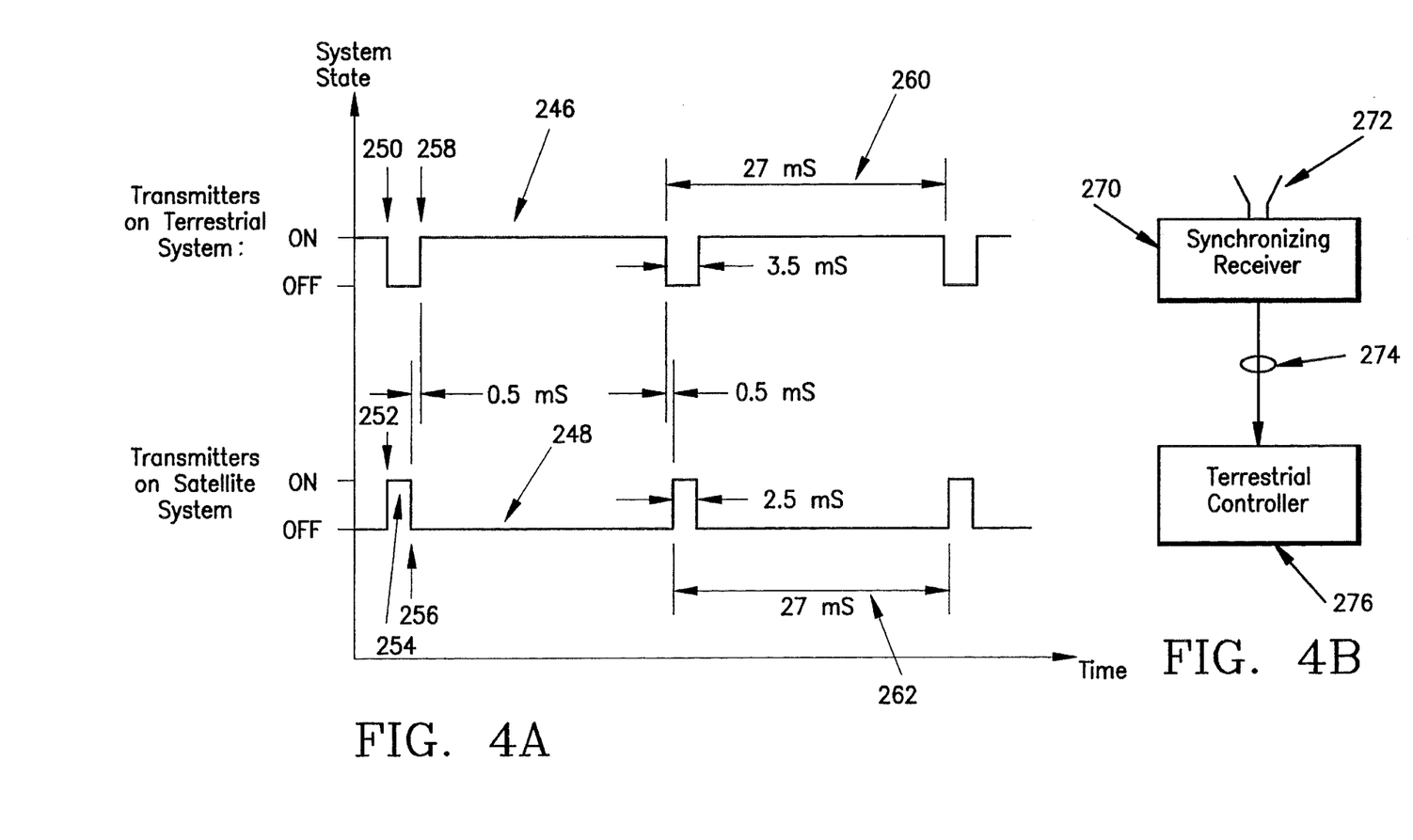
FIG. 4b diagrammatically illustrates the connection between a synchronizing receiver and a terrestrial controller.
FIG. 4a illustrates the temporal relationships between satellite and terrestrial transmitter states.

FIG. 4A illustrates a timing diagram of signal transmissions inside a cell; this is a state diagram with transmitter state shown as a function of time. The transmitters for the terrestrial system, shown in upper trace 246, remain mostly on, while the transmitters for the satellite, shown in lower trace 248, remain mostly off. First, the terrestrial tower and subscriber units cease transmissions at transition 250. 0.5 mS later, the satellite and earth station begin transmissions at transition 252. The satellite system continues to transmit for 2.5 mS, shown as time interval 254, and then the satellite hopping spot beam begins to move onto another cell at transition 256. Finally, the terrestrial system resumes transmission, shown as transition 258, to begin communicating. The period of the terrestrial system cycle 260 and satellite system cycle 262 are each 27 mS, and since the terrestrial service is active in all but 3.5 mS of the 27 mS period, the terrestrial service has an "on time" or duty cycle of 87%.

Thus, terrestrial service uses the allocated spectrum a majority of the time without interference by the satellite service. This method of spectrum sharing between satellite and terrestrial communication services allows more efficient utilization of the allocated spectrum in a given geographical (or politically defined) area.

A component level diagram of the synchronizing receiver is illustrated in FIG. 4B. The physical location of the synchronizing receiver 270 and its antenna 272 is not important (these correspond to synchronizing receiver 228 and antenna 230, as illustrated in FIG. 4). The purpose of the synchronizing receiver 270 is to provide a trigger signal 274 to the terrestrial controller 276 for synchronizing terrestrial communications with satellite communications. The terrestrial controller 276 can be the terrestrial tower controller or another controller, remotely located, which is used in conjunction with and connected to the terrestrial tower controller. Processing of trigger signal 274 allows terrestrial controller 276 to indicate when satellite transmissions are active, thus the trigger signal 274 provides satellite timing information to the terrestrial controller 276. In turn, the terrestrial controller 276 controls when the transmitters on the terrestrial tower and terrestrial subscriber units operate.

For the description above, it is assumed that the synchronizing receiver 228 (as shown in FIG. 4) has acquired a satellite downlink signal from spot beam 231. In the event synchronization is lost (due to loss of downlink signal or for some other reason), the terrestrial service initiates a search timing cycle. In the search cycle, the terrestrial service remains inactive for 3.5 mS to search for the satellite signal but the terrestrial service reduces its duty cycle to 85% by increasing the cycle time from the 27 mS (under normal operation, as above) to 24 mS. With the terrestrial service operating at a 24 mS cycle time and the satellite remaining at a 27 mS scan cycle, both systems have a common period of 216 mS, and this is the largest amount of time that the satellite and terrestrial service could then remain unsynchronized.

In addition to temporal synchronization, the spatial definition of cell boundaries must be synchronized, a priori, between satellite and terrestrial service providers. The preferred embodiment of the present invention provides for the following arrangement of nested geographic areas. A region is defined as a plurality of satellite super cells. Each super cell contains a plurality of terrestrial cells, and each terrestrial cell is divided into a plurality of sectors.

Figure 5:
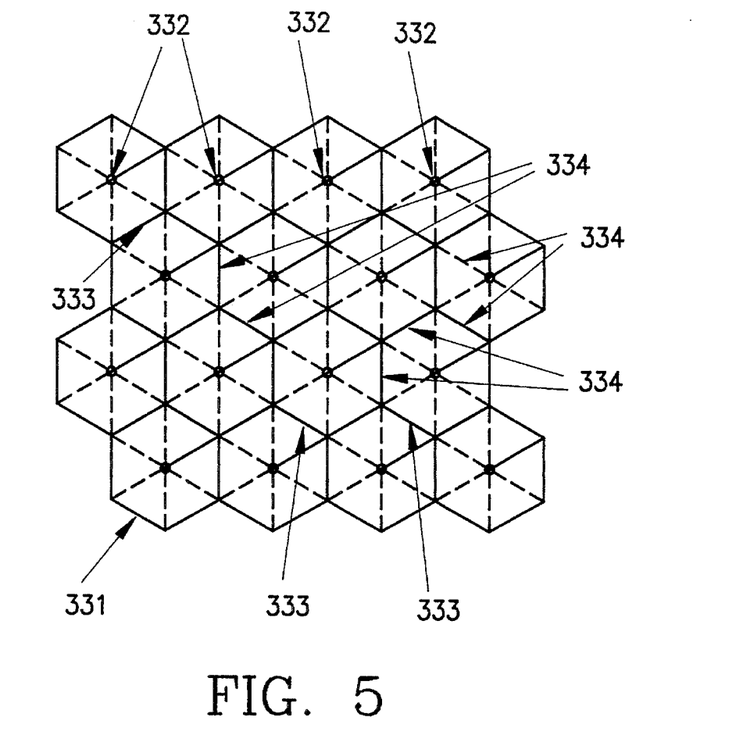
FIG. 5 illustrates a plan view of a first embodiment of a satellite cell along with spatial definitions of terrestrial cell boundaries.

Turning now to FIG. 5, the preferred embodiment of the geographical layout for the present invention is shown in which a satellite cell 331 is illustrated in plan view. The spot beam from the satellite covers all satellite subscriber earth stations in satellite cell 331 at one instant in time. When the spot beam moves outside the satellite cell 331, one or more terrestrial towers 332 within the satellite 331 may simultaneously activate communication with terrestrial subscriber units within terrestrial cells 333. In the embodiment of FIG. 5, sixteen terrestrial cells 333 are contained within the larger satellite cell 331 and they are centered about the terrestrial towers 332. Each terrestrial cell 333, in the example shown in FIG. 5, is further subdivided into six terrestrial cell sectors 334.

The satellite cell 331 is spatially divided into many terrestrial cells 333, so that the spectrum in accordance with the invention, can be reused in a given geographic area at different times, thereby delivering higher overall data rates for all subscribers, when both satellite and terrestrial services are taken into account. In addition to spectrum reuse by multiplicity of terrestrial cells, the terrestrial towers 332 have sectored antennas to further subdivide and further increase the data throughput for terrestrial subscribers in the cell sectors 334.

With the method of the present invention, satellite and terrestrial services must share pre-arranged satellite cell and terrestrial cell boundaries to prevent multiple uses of a given spectrum allocation in a given geographical area at the same time. As shown in FIG. 5, satellite cell 331 is approximately square and specifically conforms to a perimeter surrounding the sixteen terrestrial cells 333. By sharing boundaries, terrestrial and satellite subscribers prevent mutual interference (or problems with electro-magnetic compatibility).

Figure 6:
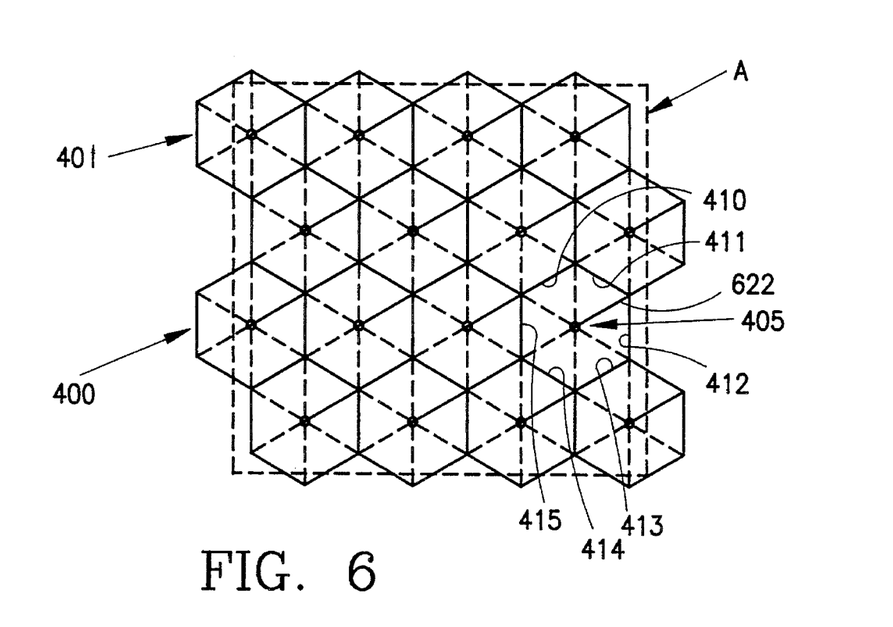
FIG. 6 illustrates a plan view of a second embodiment of a satellite cell along with spatial definitions of terrestrial cell boundaries.

If the satellite cell is defined as a square, shown as A in FIG. 6, then terrestrial cell overlap with two satellite cells may occur. If a satellite cell boundary crosses through a terrestrial cell, some terrestrial subscribers will be synchronized with the satellite subscribers while other terrestrial subscribers in that terrestrial cell will interfere with the satellite subscribers in the adjacent satellite cell.

In one example of the use of the invention, the terrestrial cells may be LMDS cells having six segment antennas, thus giving six sectors as shown in FIG. 6. In the example shown, LMDS cell 405 has six geographical sectors defined by the six segment antenna coverages shown as 410, 411, 412, 413, 414, and 415. Sixteen of these LMDS cells will fit roughly into one satellite communications cell, shown as A in FIG. 6, which may be a Teledesic cell. In this example, the LMDS cells and the Teledesic cells are arranged, a priori, to allow the LMDS systems to be TDMA synchronized as well as spatially synchronized with the Teledesic systems. With this method, the LMDS system and the Teledesic system can share the valuable spectrum resource thereby utilizing that spectrum more efficiently than could be done with either LMDS or Teledesic alone.

Figure 7:
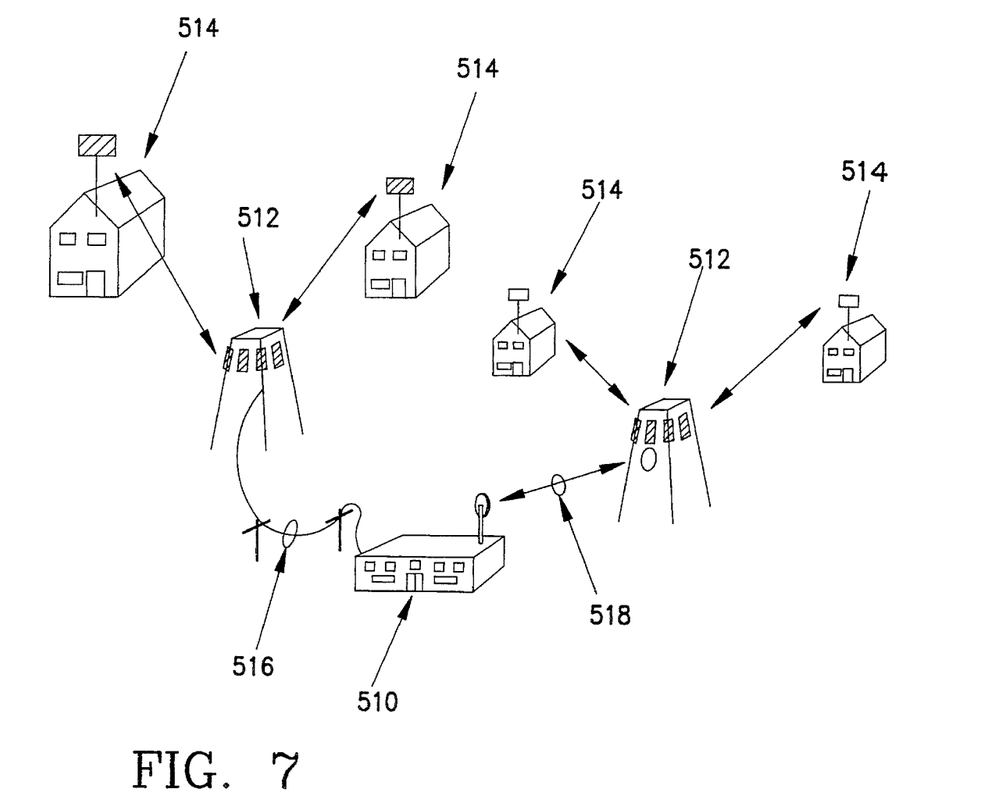
FIG. 7 illustrates a more detailed view of the system of FIG. 5, including major components of the system.

Turning now to FIG. 7, a more detailed description of a terrestrial system is provided. From a system level, the major components of the terrestrial system are a central station 510, a multiplicity of base stations 512 (corresponding to terrestrial towers, as discussed above), and subscriber units 514 (corresponding to terrestrial subscriber units, as discussed above) at residential and commercial locations. High data rate digital information flows from the central station via fiber optic links 516 or point-to-point microwave links 518 to the base stations 512. The base stations 512 convert the digital information to high frequency analog signals and transmit the analog signals to subscriber units 514. For information returning from residential and commercial locations, the subscriber units 514 convert the residential or commercial information into high frequency analog signals for transmission. Base stations 512 receive the subscriber unit information, and relay the information back to the central station 510 using the fiber optic links 516 or point-to-point microwave links 518.

Figure 8:
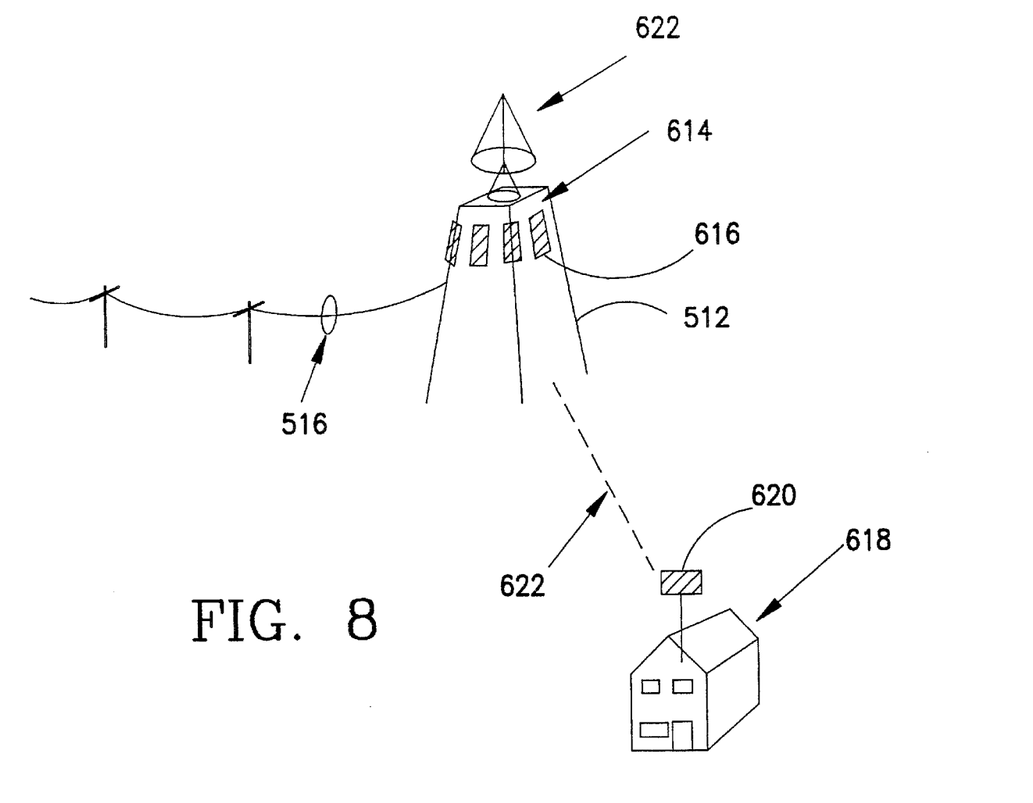
FIG. 8 illustrates an expanded view of a base station for the system of FIG. 7, including two of the sic 60° sectored antennas required to provide complete 360° coverage.

As illustrated in an expanded view in FIG. 8, a base station 512 receives the high data rate signal over the fiber optic cable and de-multiplexes the high data rate signal into six lower data rate signals. In the base station are six RF modems, and each uses one low data rate digital signal to modulate a high frequency analog signal. Each high frequency analog signal feeds into a corresponding 60° sectored antenna such as antenna 614 on the base station 512, with the six antennas providing complete 360° coverage. Each sectored antenna substantially confines its radiation to a 60° wide beam which emanates from the base station 512. To ensure that radiating signals from adjacent sectored antennas on the base station 512 do not interfere with each other, the polarization of adjacent sector antennas is alternated; thus, for example, right-hand-circular polarization is used for sector antenna 614 and left-hand-circular polarization is used for an adjacent sector antenna 616. For a subscriber unit 618 on the electromagnetic seam or boundary 622 (see FIG. 6) between adjacent sector antennas, a polarized antenna 620 on the subscriber unit is used to select which sector antenna on the base station, 614 or 616, to communicate with.

In order to adapt the terrestrial system of the foregoing example to the method of the present invention, a synchronizing receiver 622 is located at the base station 512. Communication within the terrestrial system ceases for 3.5 mS while the synchronizing receiver 622 monitors the scanning cycle of a hopping spot beam signal from a satellite. If necessary, the synchronizing receiver adjusts its internal clock to agree with the timing of the scan cycle from the satellite. If the spot beam signal from the satellite is lost, the terrestrial system initiates a search timing cycle as discussed above.

As previously discussed, the location and number of synchronizing receivers 622 is not important. The purpose of a synchronizing receiver 622 is to provide a trigger signal for satellite timing information. This trigger signal is ultimately applied to a terrestrial tower controller which is part of base station 512.

Figure 9:
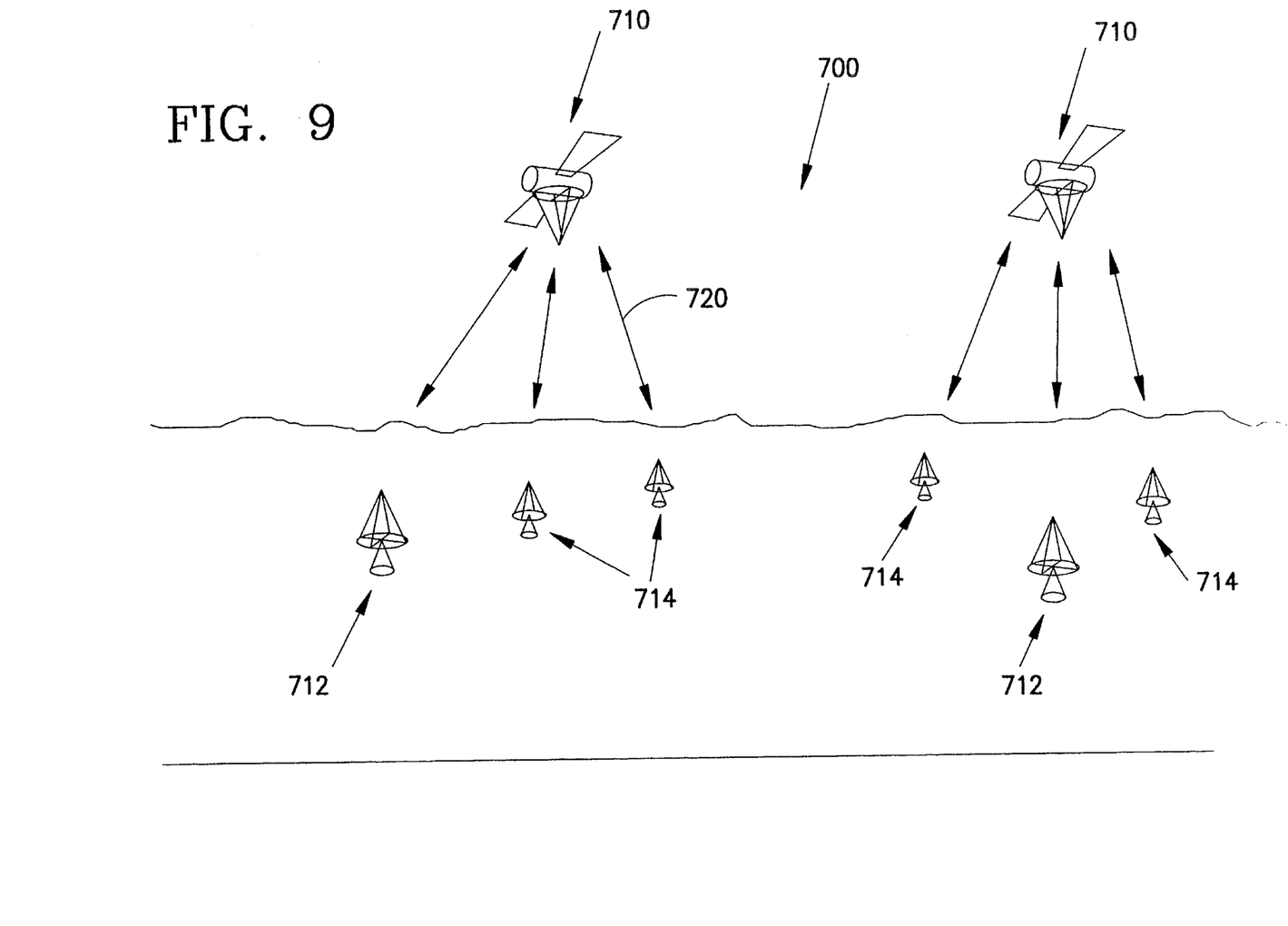
FIG. 9 illustrates a more detailed view of the satellite system of FIG. 5, including orbiting satellites and earth stations.

Turning now to FIG. 9, a more detailed description of a satellite system 700 such as a Teledesic system is provided. From a systems level, the major components of the system 700 are orbiting satellites 710, and two types of earth stations, Gigalink (TM) stations 712, and Standard Terminals 714. The Gigalink stations 712 and Standard Terminals 714 operate at different frequencies in the same frequency band. Gigalink stations 712 are physically larger, are fewer for a given geographical area, and have higher data capacity than Standard Terminals 714. While the satellite 710 moves, Gigalink stations 712 operate continuously and have a directional beam that is mechanically (or electronically) steered to track the satellite. The Standard Terminals 714 have stationary directional antennas pointing upwards and use time domain multiple access to operate intermittently. As discussed above, when a hopping spot beam 720 on satellite 710 moves into a Teledesic satellite cell that contains the Standard Terminal subscriber unit 714, the Standard Terminal 714 is activated and transmits and receives information. While the Standard Terminal 714 is activated, it uses frequency domain multiple access to uplink information, and uses digital time domain multiple access to download information. As it pertains to the present invention, the modulation technique within each TDMA time slot is not important.

For the satellite system 700 using a Teledesic system, there are no modifications or adaptations required for implementation of the present invention. For the operation of an LMDS system using the method of the present invention, a synchronizing receiver must be added and, in operation, LMDS signal transmission must cease for 3.5 mS in every 27 mS time interval. In addition, during operation, the LMDS must initiate a search timing cycle to find and acquire the timing of the hopping spot beam on the Teledesic satellite.

The LMDS system has a standardized communications protocol and standardized LMDS communications signals. These need not be altered for use of the present invention, other than for synchronization purposes, as illustrated above. Analogously, the Teledesic system has a standardized communications protocol and standardized Teledesic communications signals. The system and method of the present invention is compatible with the Teledesic system.

The foregoing describes the preferred embodiments of the present invention along with a number of possible alternatives. A person of ordinary skill in the art will recognize that modifications of the described embodiments may be made without departing from the true spirit and scope of the invention. The invention is therefore not restricted to the embodiments disclosed above, but is defined in the following claims.

What is claim is:

1. A method for spatially and temporally synchronizing space based and ground based transmitting elements, comprising:

a) defining a first geographic area for coverage by a first ground based communications transmitter;

b) defining a second geographic area, adjacent said first geographic area, for coverage by a second ground based communications transmitter;

c) defining a third geographic area for coverage by a first space based communications transmitter, wherein said first and second geographic areas are situated within said third geographic area;

d) transmitting, from said first ground based transmitter, within said first geographic area, only when said first space based transmitter is not transmitting;

e) transmitting, from said second ground based transmitter, within said second geographic area, only when said first space based transmitter is not transmitting; and f) transmitting, from said first space based transmitter, within said third geographic area, only when neither of said first and second ground based transmitters are transmitting.

2. The method of claim 1, further comprising:

transmitting from a second space based communications transmitter, only when said first space based transmitter is not transmitting;

wherein said first space based communications transmitter and said second space based communications transmitter are orbiting and moving in a track over the earth which includes said third geographic area.

3. The method of claim 1 wherein said first and second ground based communication transmitters are transmitting LMDS signals.

4. The method of claim 1 wherein said first space based transmitter is transmitting Teledesic system satellite transmitter signals.

5. A method for spatially and temporally synchronizing space based and ground based transmitting elements, comprising:

a) defining a first geographic area for coverage by a first ground based communications transmitter;

b) defining a second geographic area, contiguous to the first, for coverage by a second ground based communications transmitter;

c) defining a third geographic area, contiguous to the second, for coverage by a third ground based communications transmitter;

d) defining a fourth geographic area for coverage by a first space based spot beam, wherein said first and second geographic areas are situated within said fourth geographic area;

e) defining a fifth geographic area, contiguous to the fourth, for coverage by a second space based spot beam, wherein said third geographic area is situated within said fifth geographic area;

f) transmitting, from said first ground based transmitter, within said first geographic area, only when said first space based spot beam is not transmitting a downlink beam;

g) transmitting, from said second ground based transmitter, within said second geographic area, only when said first space based spot beam is not transmitting a downlink beam;

h) transmitting, from said third ground based transmitter, within said third geographic area, only when said second space based spot beam is not transmitting a downlink beam;

i) transmitting, from said first space based spot beam, within said fourth geographic area, only when said first and second ground based transmitters are not transmitting; and j) transmitting, from said second space based spot beam, within said fifth geographic area, only when neither of said third ground based transmitter and said first space based spot beam are transmitting.

6. The method of claim 5 wherein said first, second and third ground based communication transmitters are transmitting LMDS signals.

7. The method of claim 5 wherein said first and second space based spot beams are transmitting Teledesic system satellite transmitter signals.

8. A system for spatially and temporally synchronizing space based and ground based transmitting elements, comprising:

a) a first ground based communications transmitter covering a first geographic area;

b) s second ground based communications transmitter covering a second geographic area, adjacent said first geographic area;

c) a first satellite having a first space based communications transmitter for covering a third geographic area, wherein said first and second geographic areas are situated within said third geographic area;

d) first synchronizing means for transmitting, from said first ground based transmitter, within said first geographic area, only when said first space based transmitter is not transmitting;

e) second synchronizing means for transmitting, from said second ground based transmitter, within said second geographic area, only when said first space based transmitter is not transmitting; and f) third synchronizing means for transmitting, from said first space based transmitter, within said third geographic area, only when neither of said first and second ground based transmitters are transmitting.

9. The system of claim 8 further comprising:

a first earth station uplink transmitter, located within said first geographic area, for communication with a receiver on said first satellite, and fourth synchronizing means for transmitting from said first earth station uplink transmitter, to said first satellite receiver, only when said first ground based transmitter is not transmitting.

10. The system of claim 8, further comprising:

a second satellite including a second space based communications transmitter including fifth synchronizing means for transmitting only when said first space based transmitter is not transmitting;

wherein said first satellite and said second satellite are in orbit and moving in a track over the earth which includes said second geographic area.

11. The system of claim 8 wherein said first and second ground based communication transmitters are LMDS transmitters having synchronizing receivers.

12. The method of claim 8 wherein said first space based transmitter comprises a Teledesic system satellite transmitter.

* * * * *